United States Patent [19]  [11] 4,008,077
Wallace  [45] Feb. 15, 1977

[54] REJUVENATION OF WASTE SILVER-LADEN SOLUTIONS

[76] Inventor: Richard A. Wallace, 3425 SW. Barbur Blvd., No. 103, Portland, Oreg. 97201

[22] Filed: Dec. 24, 1975

[21] Appl. No.: 644,243

Related U.S. Application Data

[63] Continuation-in-part of Ser. No. 407,740, Oct. 18, 1973, abandoned.

[52] U.S. Cl. ............................... 75/118 P; 75/109; 75/121; 96/61 R
[51] Int. Cl.$^2$ .................. C22B 11/04; C22B 34/32
[58] Field of Search ................. 75/109, 118 P, 118; 96/61 R

[56] References Cited

UNITED STATES PATENTS

| | | | |
|---|---|---|---|
| 1,624,172 | 4/1927 | Levy | 96/61 R |
| 2,214,765 | 9/1940 | Holzwarth | 96/61 R |
| 2,290,206 | 7/1942 | Pool | 96/61 R |
| 2,507,175 | 5/1950 | Pool | 75/118 P X |
| 3,660,079 | 5/1972 | Govani | 75/109 |

*Primary Examiner*—G. Ozaki
*Attorney, Agent, or Firm*—Townsend and Townsend

[57] ABSTRACT

A method is provided for recovering metallic silver from used silver-laden solutions, such as spent photographic fix, stop baths, stabilizers, electrolytic fix tailings, and waste silver-plating drag out and rinse solutions. The silver-laden solutions are treated with mechanically worked narrow aluminum foil strips, threads or chaff, substantially completely covered with a few microns thick imperfect layer of aluminum oxide. The resulting silver-free solution may then be chelated with a suitable chelating agent to provide a rejuvenated solution, which may be repeatedly used and restored.

The method provides high silver recovery efficiency, and little maintenance, while providing the capability or repetitive use of various solutions employed in photographic development, where silver is obtained.

7 Claims, No Drawings

REJUVENATION OF WASTE SILVER-LADEN SOLUTIONS

CROSS-REFERENCE TO RELATED APPLICATIONS

This application is a Continuation-in-Part of application Ser. No. 407,740 filed, Oct. 18, 1973, now abandoned.

BACKGROUND OF THE INVENTION

1. Field of the Invention

Substantially large amounts of silver are employed in the development of photographs. With the increasing shortage of silver and its concomitant increase in price, efficient, inexpensive procedures for recovering the silver are desirable. In order for a procedure to be satisfactory, it must have a high efficiency in removing substantially all of the silver ion from the solution, reducing it to the silver metal. The silver metal must be produced in a form substantially free of contaminants and readily isolatable. Furthermore, it is desirable to be able to re-use the resulting solution, rather than discarding the relatively expensive chemicals which are employed in the photographic development process. Therefore, in reducing the silver, it is preferable that the oxidized form of the reducing agents employed in the developing solution should also be reduced. Not only should they be reduced, but they should be returned to the solution in a form useful for re-use of the development solution.

Description of the Prior Art

Metals have been employed, such as iron, zinc and copper for recovery of silver. However, these metals do not provide a rejuvenated development solution, and the resulting metal salts can be harmful contaminants and pollutants. Eastman Kodak commercially supplies a silver-recovery system providing renewable cartridges employing iron mesh.

SUMMARY OF THE INVENTION

Fine divided strips of mechanically worked aluminum foil or gauze lightly coated with an oxide coating are employed in combination with silver laden solutions used in photographic development. The silver which results forms as a sludge, and by the addition of a chelating agent for the aluminum, the resulting solution may be re-used and repeatedly rejuvenated.

DESCRIPTION OF THE SPECIFIC EMBODIMENTS

A method is provided for recovering silver from waste silver ion solutions as silver metal in easily recoverable form. The silver laden solution is contacted with finally divided aluminum strips having a high surface area and obtained from mechanically worked aluminum e.g. rolled, extruded, etc., which have a thin imperfect aluminum oxide coating. The aluminum is conveniently employed as chaff, mesh, gauze, etc., where the cross-section is small as compared to the length of the strip. The solutions can be passed through a column of the aluminum strips and strands, mixed with aluminum strips and then decanted, or otherwise contacted with the aluminum strips to provide an efficient contact between the aluminum and the solution.

Conveniently, a column of the aluminum strips is provided in a chamber which is supported by a perforated plate. The silver laden solution is introduced into the bottom of the chamber allowed to flow or percolate upwardly and exit from a port near the top of the chamber. The silver metal which forms settles down through the perforations into a lower chamber, where the silver metal forms as a silver sludge.

The choice of the form of aluminum is important to this invention. Strips and gauze are mechanically worked so as to provide a thin imperfect aluminum oxide coating, which allows for a moderate reaction between the silver ion and aluminum to form silver metal which readily separates from the aluminum and precipitates as an easily recoverable sludge. The strips which may be employed are derived from rolled aluminum sheets which may then be split and then mechanically stretched or expanded to form a continuous mesh, which may be used as a roll or may be cut to form thin strips, commonly referred to as chaff.

The aluminum which is employed will normally be at least 95% aluminum, more usually at least 99% aluminum and desirably substantially free of metals such as copper and iron.

The aluminum oxide coating will generally be at least 10 A thick and not more than about 5000 A thick, generally not more than about 500 A thick. The thickness of the aluminum oxide coating and the degree of imperfections determines the rate of reaction. Various techniques for varying the aluminum oxide coating thickness and the degree of imperfections are known in the art. The aluminum oxide coating is largely amorphous and probably gamma-aluminum oxide.

For the purposes of the subject invention, aluminum strips as chaff or mesh can normally be used as obtained commercially. However, since the rate of reaction between the silver ion and the aluminum is dependent upon the silver ion concentration, the pH of the medium, as well as the presence of other ions, in some instances it may be desirable to modify the aluminum oxide coating. An induction period is normally noted when the silver laden solution is contacted with the aluminum strips. That is, the formation of silver metal is first noted after a specific time period after contact of the silver containing solution with the aluminum. This is readily evident as silver metal begins to form as a gray particulate coating on the aluminum strips and slough off. A minimum induction period of 1 minute is required for satisfactory results, and preferably the induction period should be at least about 2 minutes. While higher induction periods are permissable, they normally do not offer any advantages.

The induction period can be readily increased by treating the aluminum with steam, which increases the size of the aluminum oxide coating. Alternatively, the induction period may be diminished by mechanical treatment of the aluminum, such as rolling, stressing, or flexing, which increases the porosity of the aluminum oxide coating. In addition, chemical treatment may be employed, which also increases the porosity or pitting of the aluminum oxide coating. Since the induction period varies with the silver ion concentration, the aluminum oxide coating should be modified as required, in accordance with the silver ion concentration encountered during processing.

The strands, both in the mesh and chaff will generally have a width about 0.1 to 3mm, usually from about 0.2 to 1.5mm. With the chaff, the length will usually be at least ½ inch or longer. As indicated previously, the mesh can be used in large rolls, where the strips are extended so as to be porous and allow for the percolation through the roll.

The subject invention is particularly advantageous with spent photographic fix solutions. In accordance with this invention, silver is efficiently removed, generally in greater than 99% of the amount of silver present, without deterioration of the development solution. In this invention, there is no oxidation of the reducing agent present in the development solution, the reduction of the silver cation is not unduly vigorous, the pH is maintained substantially constant and the silver is obtainable without contamination.

After the aluminum treatment, the solution, substantially free of silver ion, may then be filtered through a course filter, such as glass wool or ceramic, to prevent any small silver particles from being carried along with the development solution. The isolated silver metal may contain some aluminum metal contaminant. The contaminant may be readily removed by treatment with a mild mineral acid e.g. 3N hydrochloric acid.

Substantial concentrations of aluminum ion in the development solution are not desirable. The concentration of aluminum ion can be substantially reduced by the treatment with an ion-exchange column, e.g. weak acid resin, Amberlite IRC/50, or by chelation with a polycarboxylic acid, such as citrate. The addition of citrate substantially inhibits any deleterious effect on subsequent film processing, as a result of the presence of the aluminum. The amount of citrate, particularly alkali metal citrate, e.g. sodium or potassium, will usually be sufficient to provide concentrations of from 1 to 30, usually about 2 to 20g./1.

Typical fix solutions contain sodium thiosulfate, aluminum hardeners and boric acid buffer, and have a mildly acid pH, e.g. 4.5. While the subject invention is primarily for use with photographic fix solutions, other processing solutions containing silver ion can also be processed to recover the silver. For example, cyanide silver plating drag out solutions will contain potassium cyanide, potassium carbonate, and silver cyanide at a basic pH, frequently in excess of 10. These solutions as well as other silver-laden solutions may be readily treated with the aluminum so as to remove the silver ion and rejuvenate the solution.

In order to demonstrate the subject invention, the following experiments were carried out.

Shredded aluminum foil together with a small quantity of sodium citrate crystals were packed into a rigid polyethylene or polyester cylinder cartridge. Spent photographic fix was passed through the cartridge in a semi-continuous manner. This process was either manually or automatically operated. An angle valve allowed adequate contact time for the waste fix to react with the aluminum foil to effect silver precipitation. Typical fix contact times were determined from the aluminum foil induction period calibration curve, developed from the data set forth in Table I.

TABLE I

| Silver Content in Spent Fix gms/l | Induction Period min. |
| --- | --- |
| 0.4 | 200 |
| 1.0 | 50 |
| 1.8 | 14 |
| 3.8 | 6 |
| 5.8 | ~5 |
| 7.8 | 3 |

The treated fix was then recirculated through the cartridge filter medium and then pumped to the rejuvenated fix holding tank. The remaining contents of the cartridge consisting of metallic silver and unreacted aluminum foil were then removed and sent to a silver reclaimer.

Table II presents typical rates of silver displacement from spent photographic fix solutions containing several concentrations of silver and waste fix. This aluminum foil-citrate cartridge treatment was repeated eight times with the same rejuvenated photographic fix, that had been exhausted or spent by film fixing processing. Thus, the effective life of a fix solution was prolonged eight-fold. No stains or scums or inferior picture imaging were observed on the process motion picture film, even after being fixed by the finally rejuvenated fix solution.

TABLE III

RATE OF SILVER DISPLACEMENT IN SPENT PHOTOGRAPHIC FIX BY EXCESS SHREDDED ALUMINUM FOIL

| Silver Conc. After 0 hour | Silver Conc. After 1 hour | Silver Conc. After 3 hours | Silver Conc. After 16 hours |
| --- | --- | --- | --- |
| g. Ag/l. | g. Ag/l. | g. Ag/l. | g. Ag/l. |
| 0.10 | 0.10 | 0.10 | 0.0 |
| 0.40 | 0.40 | 0.20 | 0.0 |
| 1.9 | 0.40 | 0.15 | 0.0 |
| 3.9 | 0.45 | 0.20 | 0.0 |
| 5.8 | 0.30 | 0.10 | 0.0 |
| 7.7 | 0.35 | 0.15 | 0.0 |

A small fix rejuvenator unit similar to an ordinary bag filter was used for small tray photofinishing operators. Excess shredded aluminum foil and sodium citrate were placed in the filter bag. During the fix rejuvenation process, the silver was deposited in the bag filter and the sodium citrate dissolved into the fix. External agitation was employed.

This fix rejuvenator bag unit was best allowed to run overnight to insure complete silver removal from spent fix. The following morning, the fix would be rejuvenated and the silver and unreacted aluminum foil could be easily recovered.

Chromium hardening fixing baths were also investigated and the aluminum foil-citrate fix rejuvenation process employed. There was no difference found between the aluminum foil induction periods and the rates of silver precipitation observed in either the spent photographic fix containing chromium as the hardener or in the usual spent Kodak F-5 photographic fix solution containing aluminum as the hardener. The displaced aluminum did not adversely affect the fixing or the hardening performance of the rejuvenated chrome alum photographic fix.

Waste electrolytic fix tailing solutions were also investigated. Present electrolytic silver recovery systems leave small amounts of residual silver (approximately 0.04 troy oz. per gallon of waste fix) in the tailings.

A plastic cartridge filled with aluminum foil chaff, whose oxide coating was imperfect and porous, was employed to react substantially on contact with waste photographic fix tailing solution from present electrolytic silver recovery units. A typical electrolytic fix tailing solution containing approximately 0.02 troy oz. of silver per gallon was passed through the bed aluminum foil chaff. Residual amounts of silver in the tailing solution were precipitated and recovered within the cartridge. With two fix-rejuvenated cartridges containing fine shred aluminum chaff connected in series with ¾ inch inside diameter, flexible vinyl tubing, and allowing the solution to flow by gravity through the pair of cartridges and recirculating for adequate contact time, a silver free effluent was obtained.

Finally, silver plating drag-out and rinse solutions which are known to contain from about 0.1–2 troy oz. per gallon were tested. The runs, following the above procedures, removed all of the silver in metallic form and provided silver depleted solutions which could be reused repeatedly after rejuvenation before discarding. The two waste solutions tested had the following compositions:

TABLE III

|  | Cyanide Silver-Plating Drag Out Solutions | Silver Plating Rinse Waste |
|---|---|---|
| Silver cyanide | 10g./l or 1 troy oz. per gallon | 2g./l or 0.2 troy oz. per galon |
| Potassium cyanide | 25g./l | 4g./l |
| Potassium carbonate | 20g./l | 5g./l |
| pH 11.5 | | |

The waste solutions were intermittently pumped through the shredded aluminum foil cartridge. After several minutes, silver was observed to precipitate, with the aluminum forming aluminate ion in view of the high pH. The solutions were filtered and could then be reused in the silver plating operation. After six fold rejuvenation and reuse, the solutions were discarded.

It is evident from the above results, that an extremely efficient and economical system is provided for substantially quantitatively removing silver ion from a variety of solutions employed in the removal of silver ion, particularly in photographic processing. Any residual aluminum can be readily removed from the silver, so that substantially pure colloidal silver is obtained. Furthermore, where concern about film hardening is present, as a result of the increased aluminum concentration, this can be readily obviated by the introduction of a sufficient amount of a chelating agent, such as citrate.

Although the foregoing invention has been described in some detail by way of illustration and example for purposes of clarity of understanding, it will be obvious that certain changes and modifications may be practiced within the scope of the appended claims.

What is climed is:

1. A method for recovering silver metal from spent silver-laden solutions which comprises:
   contacting said spent silver-laden solution with with a chelating agent and finely divided mechanically worked aluminum coated with an imperfect aluminum oxide coating, which results in an induction period of at least one minute, when said solution is first contacted with said aluminum, whereby finely divided silver metal is formed; and
   recovering the finely divided silver metal.

2. A method according to claim 1, wherein said aluminum is in the form of aluminum chaff.

3. A method according to claim 2, wherein said chelating agent is a citrate.

4. A method according to claim 1, wherein said aluminum is in the form of aluminum gauze.

5. A method according to claim 1, wherein said chelating agent is a citrate.

6. A method for recovering silver metal from a spent silver-laden photographic fix solution which comprises:
   contacting said spent photographic fix solution with finely divided mechanically worked aluminum, having a large length to thickness ratio and coated with an imperfect aluminum oxide coating so as to provide an induction period of at least about one minute when said solution and aluminum are first contacted, and citrate, whereby finely divided silver metal is formed and aluminum ion is formed which is chelated by said citrate; and
   recovering the finely divided silver metal and the substantially silver free rejuvenated photographic fix solution.

7. A method according to claim 6, wherein the amount of citrate is sufficient to provide a concentration of from about 1 to 30 gms/1.

* * * * *